UNITED STATES PATENT OFFICE.

JOHN H. RYAN, OF KALAMAZOO, MICHIGAN, ASSIGNOR TO DUNCAN R. SEAMAN, OF CHICAGO, ILLINOIS.

PROCESS FOR TREATING CLAY.

1,385,716.   Specification of Letters Patent.   Patented July 26, 1921.

No Drawing.   Application filed April 7, 1921. Serial No. 459,365.

*To all whom it may concern:*

Be it known that I, JOHN H. RYAN, a citizen of the United States, residing at Kalamazoo, Michigan, have invented certain new and useful Improvements in Processes for Treating Clay, of which the following is a specification.

This invention relates to improvements in processes for treating, purifying and preparing clay particularly for use as a coating material for paper. It relates more particularly to the treatment of domestic or American clay for this purpose.

I find that many clays contain acid and also coloring matter of an organic nature, and it is the object of my invention to properly neutralize and bleach such clay.

Objects relating to details will definitely appear from the detailed description to follow.

I first break the comparatively dry clay into small lumps and subject the same to a mechanical drying process for four or five hours in the presence of heated air, which may be circulated therethrough for the purpose of increasing its efficiency. Oxidizing and bleaching in a preliminary way to a considerable extent is thus accomplished.

If there is no coarse grit, as sand or mica, in the clay I add to it about an equal weight of water. In the event that the clay is acid I treat the same with ammonia, adding about one per cent. of ammonia to the water, and charge the material into a pebble mill. The clay pulp will be in a thick pasty mass, through which the pebbles of the mill will plunge and roll, pulling and kneading the material and thoroughly admixing the water and chemical with the clay, thereby insuring complete action with a minimum of the reagent. At the same time any considerable particles of grit will be smashed and ground by the action of the pebbles and an even mixture will be secured. The ammonia acts to neutralize acid, and the reaction of the pulp should be neutral.

I then add a bleaching agent to the neutral pulp, averaging about one-half of one per cent. of the water content. The bleaching agent is either oxalic acid or peroxid of sodium. The action of the pebble mill is continued upon this material for a period which need not exceed two hours. The effect of the pebbles kneading the pulp and rolling through the same is to develop the colloids and completely divide the material and insure the perfect admixture of the bleaching agent, thereby completely acting upon the organic material and oxidizing the same.

When this action is complete, as is readily seen by inspection, a surplus of water is added to the mill so that the pulp readily flows out. I then preferably put the same into an agitator with a comparatively large amount of water and thoroughly wash the clay. I then permit the same to settle and decant the surplus water with the dissolved chemical. I then pass the mass of pulp to a filter and thereby extract as much water as can be conveniently extracted and then subject the material to the action of a drier, which finishes the material and makes it available for immediate use. If the work has been done at the paper mill, it can be at once used without drying.

Clay treated in this way will very readily disintegrate and dissolve and is available in a very short time for coating after it is introduced into the agitator for that purpose.

In this behalf I might say that if the clay is neutral and does not show an acid reaction, the ammonia or alkali step or treatment may be omitted. Also, on the other hand, where a very little coloring matter is present, it is not necessary to go through the bleaching process after the ammonia step because that chemical action secures bleaching to some extent.

I have shown the complete treatment, and desire to mention when these particular steps may be omitted. My method and process, it will be noted, is available for any kind of soluble chemical which it is desired to use in the treatment and purification of the clay. However, I find the same especially available with the particular chemicals I have mentioned, which I desire to claim specifically in connection with the broad invention, as pointed out in the appended claims.

Having thus described my invention, what I claim as new and desire to secure by Letters Patent is:

1. The process of treating clay consisting first, in breaking the same into small lumps and then drying the same in the presence of heat for the purpose of a preliminary oxidization, mixing the same with a surplus of water to settle out any grit, adding thereto ammonia to neutralize any acid in the clay, introducing the pulp into a pebble mill and acting upon the thick pulp by said pebble mill to grind the same and to thoroughly admix the ammonia therewith, next adding a bleaching agent, of one-half of one per cent. of the water content, and continuing the action of the pebble mill for a period of substantially two hours to fully admix the chemical therewith and secure its action, thereafter diluting the pulp to draw the same from the mill and subjecting the same to an agitator to entirely dissolve and remove the chemical, settling and decanting the water, withdrawing the pulp and filtering the same, and subjecting the thick pulp to a drying action to finish the product, all substantially as described for the purpose specified.

2. The process of treating clay consisting first, in breaking the same into small lumps and then drying the same in the presence of heat for the purpose of a preliminary oxidization, adding water to the extent of the weight of the pulp, adding thereto ammonia to neutralize any acid in the clay, introducing the pulp into a pebble mill to grind the same and to thoroughly admix the ammonia therewith, next adding a bleaching agent, of one-half of one per cent. of the water content, and continuing the action of the pebble mill for a period of substantially two hours to fully admix the chemical therewith and secure its action, thereafter diluting the pulp to draw the same from the mill and subjecting the same to an agitator to entirely dissolve and remove the chemical, settling, and decanting the water, withdrawing the pulp and filtering the same, and subjecting the thick pulp to a drying action to finish the product, all substantially as described for the purpose specified.

3. The process of treating clay consisting first, in breaking the same into small lumps and then drying the same in the presence of heat for the purpose of a preliminary oxidization, adding water to the extent of the weight of the pulp, adding a bleaching agent, of one-half of one per cent. of the water content, subjecting the thick pulp to the action of the pebble mill for a period of substantially two hours to fully admix the chemical therewith and secure its action, thereafter diluting the pulp to draw the same from the mill and subjecting the same to an agitator to entirely dissolve and remove the chemical, settling and decanting the water, withdrawing the pulp and filtering the same, and subjecting the thick pulp to a drying action to finish the product, all substantially as described for the purpose specified.

4. The process of treating clay consisting first, in breaking the same into small lumps and then drying the same in the presence of heat for the purpose of a preliminary oxidization, mixing the same with a surplus of water to settle out any grit, adding thereto ammonia to neutralize any acid in the clay, introducing the pulp into a pebble mill and acting upon the thick pulp by said pebble mill to grind the same and to thoroughly admix the ammonia therewith, next adding a bleaching agent, of one-half of one per cent. of the water content, and continuing the action of the pebble mill for a period of substantially two hours to fully admix the chemical therewith and secure its action, and thereafter diluting the pulp to draw the same from the mill and washing away the chemical products, for the purpose specified.

5. The process of treating clay consisting first, in breaking the same into small lumps and then drying the same in the presence of heat for the purpose of a preliminary oxidization, adding water to the extent of the weight of the pulp, adding thereto ammonia to neutralize any acid in the clay, introducing the pulp into a pebble mill to grind the same and to thoroughly admix the ammonia therewith, next adding a bleaching agent, of one-half of one per cent. of the water content, and continuing the action of the pebble mill for a period of substantially two hours to fully admix the chemical therewith and secure its action, thereafter diluting the pulp to draw the same from the mill and washing away the chemical products, for the purpose specified.

6. The process of treating clay consisting first, in breaking the same into small lumps and then drying the same in the presence of heat for the purpose of a preliminary oxidization, adding water to the extent of the weight of the pulp, adding a bleaching agent, of one-half of one per cent. of the water content, subjecting the thick pulp to the action of the pebble mill for a period of substantially two hours to fully admix the chemical therewith and secure its action, thereafter diluting the pulp to draw the same from the mill, and washing away the chemical products, for the purpose specified.

7. The treatment of clay consisting in admixing the same with substantially an equal amount of water, to which chemical reagent has been added, and subjecting the same to the action of a pebble mill to thoroughly reduce the grit and admix the reagent therewith and develop the colloids of the clay.

8. The treatment of clay consisting in adding thereto an equal amount of water, with sufficient ammonia to neutralize any acidity, subjecting the same to the action of a pebble mill, adding thereto a bleaching agent and continuing the action of the said pebble mill to thoroughly admix the reagent, and incidentally and at the same time pulverize and develop the colloids of the clay.

9. The treatment of clay consisting in adding thereto an equal amount of water, subjecting the same to the action of a pebble mill, adding thereto a bleaching agent and continuing the action of the said pebble mill to thoroughly admix the reagent, and incidentally and at the same time pulverize and develop the colloids of the clay.

10. The treatment of clay consisting in adding thereto an equal amount of water, with sufficient ammonia to neutralize any acidity, subjecting the same to the action of a pebble mill, and incidentally and at the same time pulverizing and developing the colloids of the clay.

11. The treatment of clay consisting in admixing the same with an amount of water substantially sufficient to reduce it to a thick pulp, to which chemical reagent has been added, and subjecting the same to the action of a pebble mill to thoroughly reduce the grit and admix the reagent therewith and develop the colloids of the clay.

12. The treatment of clay consisting in adding thereto an amount of water sufficient to reduce it to a thick pulp, with sufficient ammonia to neutralize any acidity, subjecting the same to the action of a pebble mill, adding thereto a bleaching agent and continuing the action of the said pebble mill to thoroughly admix the reagent, and incidentally and at the same time pulverize and develop the colloids of the clay.

13. The treatment of clay consisting in adding thereto an amount of water sufficient to reduce it to a thick pulp, subjecting the same to the action of a pebble mill, adding thereto a bleaching agent and continuing the action of the said pebble mill to thoroughly admix the reagent, and incidentally and at the same time pulverize and develop the colloids of the clay.

14. The treatment of clay consisting in adding thereto an amount of water sufficient to reduce it to a thick pulp, with sufficient ammonia to neutralize any acidity, subjecting the same to the action of a pebble mill, and incidentally and at the same time pulverize and develop the colloids of the clay.

In witness whereof, I have hereunto set my hand and seal in the presence of two witnesses.

JOHN H. RYAN. [L. S.]

Witnesses:
LUELLO G. GREENFIELD,
MARGARET L. GLASGOW.